Oct. 13, 1964        E. F. SCHMANK        3,152,346
PROCESS FOR THE MANUFACTURE OF SHOE LASTS
Filed April 20, 1962        2 Sheets-Sheet 1
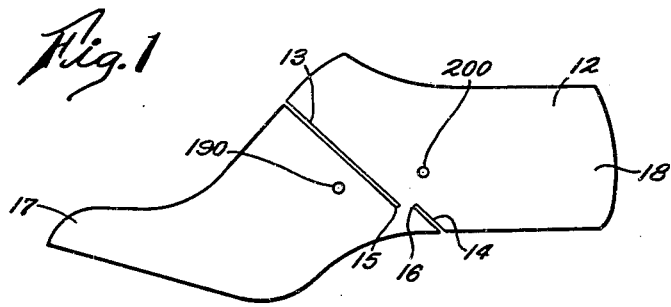
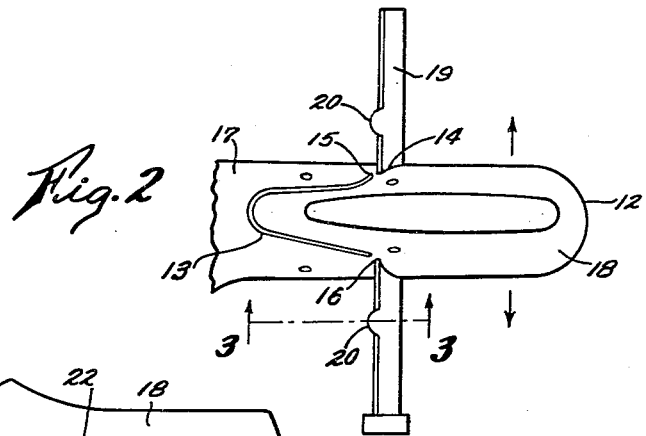
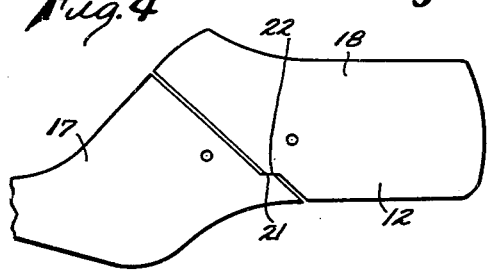
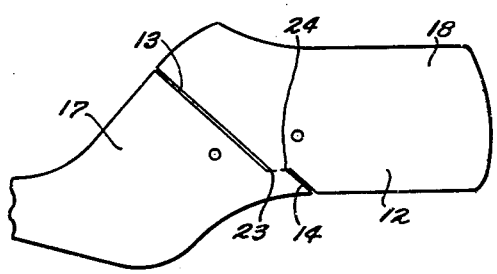
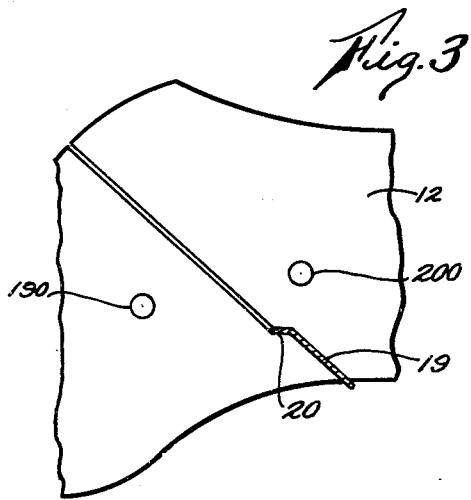
INVENTOR.
Edward F. Schmank
BY
ATTY.

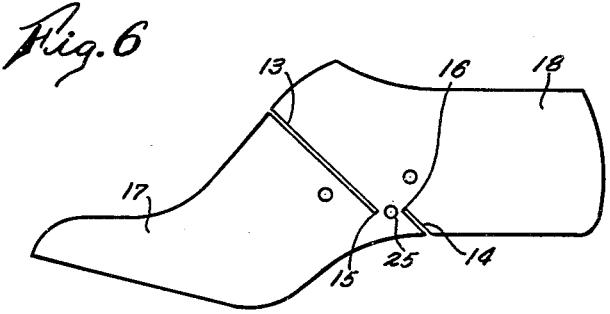
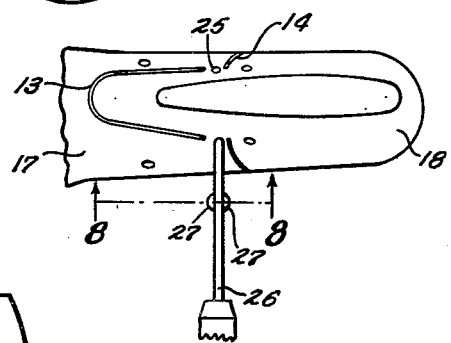
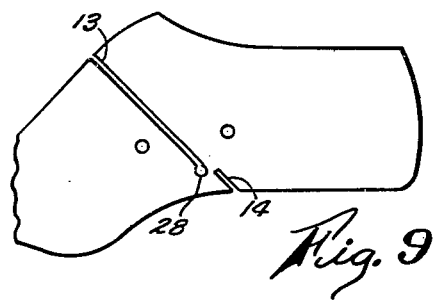
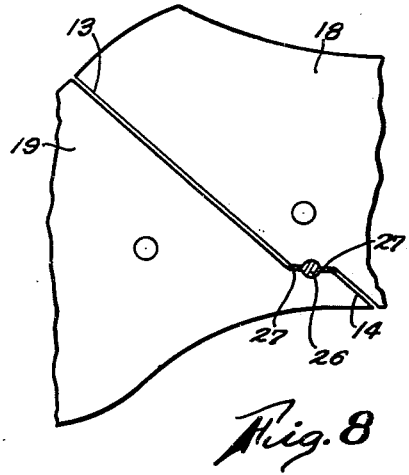
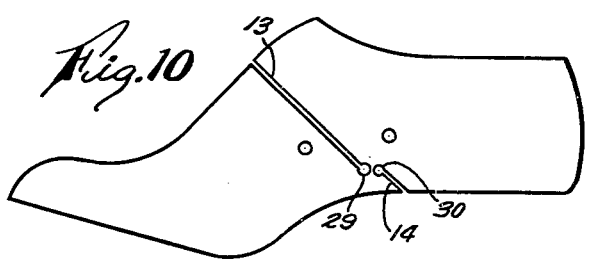
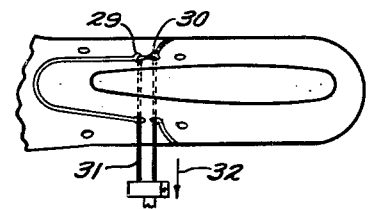

United States Patent Office 3,152,346
Patented Oct. 13, 1964

3,152,346
PROCESS FOR THE MANUFACTURE OF SHOE LASTS
Edward F. Schmank, Portsmouth, Ohio, assignor to Vulcan Corporation, Portsmouth, Ohio, a corporation of Ohio
Filed Apr. 20, 1962, Ser. No. 189,178
3 Claims. (Cl. 12—146)

This invention relates to the manufacture of shoe lasts and particularly to a process for making the shouldered, mating surfaces of two-part hinge lasts constructed from non-grain materials of the plastic type.

For many years commercial shoe lasts have been made exclusively of wood though other materials have been suggested as substitutes therefor. It was common practice in the manufacture of shoe lasts from wood to rough turn the last body from a wood billet so that the planes of the wood grain were disposed horizontally therein and extended longitudinally of the last body. To provide the required hinge for a so-called slip last from the turned last body it was only required to form a transverse saw cut through the top of the last body inclined downwardly and rearwardly of said body and then make another transverse saw cut through the bottom of the body in a plane offset rearwardly with respect to the first mentioned saw cut; the inner terminal ends of the saw cuts being adjacently located and longitudinally spaced apart in the body. The relative distance between the terminal inner ends of the two saw cuts determined the depth of the co-operative shoulders formed on the mating surfaces of the fore and heel parts of the finished last and the depth of the shoulders determined the degree of collapse of the shoe last parts. As maximum collapse was desired to insure ready removal of the finished slip last from a shoe built thereon, relatively wide co-operative shoulders were required in acceptable commercial slip lasts. After the formation of the saw cuts in the last body the last was broken by force or a blow into a fore part and a heel part, the disposition of the wood grain creating a plane of fracture that would insure a clean split of the wood in the plane of the wood grain across the terminal inner ends of the saw cuts to provide clean and horizontally positioned, co-operative shoulders for the mating surfaces of the two last parts. Thereafter the hinge pin bores and hinge receiving routes were formed in the last body and the necessary hardware installed to provide a finished slip last in wood.

With the advent of plastics in recent years and its general acceptance by industry as a practical material of construction, a considerable number of commercial shoe lasts are now being made of such plastic materials and, in general, the methods of producing hinged plastic slip lasts follow the old method of making shoe lasts from wood. Plastic materials, however, are grainless and have no predetermined planes of separation or fracture which has presented a problem of manufacture to which the present invention is addressed, especially since deep and adequate co-operative shoulders are required to secure acceptable slip lasts with suitable collapsing features.

It is therefore an object of my invention to provide a novel and highly efficient procedure for manufacturing a two-part slip last of plastic material which will provide wide, co-operative shoulders in the offset mating surfaces of a two-part slip last which accurately position the last parts in predetermined relative positions.

More specifically it is an object to provide a process of forming co-operative shoulders for the hinged parts of a two-part plastic slip last consisting of first forming a lateral saw cut through the upper part of the plastic last, then forming a second lateral saw cut through the bottom of the last body which terminates at its inner end in proximity to and in a longitudinally spaced apart position relative to the inner terminal end of the first cut and then creating a plane of fracture by slicing through the material of the plastic last body longitudinally between the terminal ends of the two cuts whereby a predetermined and clean division is made across the said body portion to form accurately positioned, wide co-operative mating shoulders for the finished slip last parts.

These and other objects and advantages of this invention will more fully appear from the following description made in connection with the accompanying drawings which show several ways of practicing my process and wherein like reference numerals refer to the same or similar parts throughout the several views, and in which:

FIG. 1 is a side elevational view of a two-part slip last made of non-grain, plastic material and shown in an intermediate stage of its manufacture.

FIG. 2 is a fragmental, top plan view of the last in FIG. 1 positioned with respect to a suitable shoulder forming tool.

FIG. 3 is a fragmental, enlarged section taken on line 3—3 of FIG. 2.

FIG. 4 is a fragmental, side elevational view of the slip last of FIG. 1 after the shoulder forming step.

FIG. 5 is a modification of the slip last shown in FIG. 4.

FIG. 6 is a side, elevational view of another modified form of the last made according to my process and shown in an intermediate state of manufacture.

FIG. 7 is a fragmental, top plan view of the last depicted in FIG. 6 positioned with respect to a suitable shoulder forming tool.

FIG. 8 is a fragmental, enlarged section taken on line 8—8 of FIG. 7.

FIGS. 9 and 10 are side elevation views of further modified forms of slip lasts made by my process.

FIG. 11 is a fragmental, top plan view of the slip last shown in FIG. 10, showing a suitable shoulder forming tool therefor.

Typical last structures which could be manufactured in plastic by my process are shown in Patent No. 2,641,783 of June 16, 1953, and No. 2,720,671 of October 18, 1955. It is to be understood that other last forms may be reproduced in plastic by this invention and particularly last constructions wherein clean fractures are desired between the co-operative shoulders for the mating surfaces of the last parts.

Now with particular reference to FIGS. 1–4 of the drawings, the numeral 12 indicates a slip last turned from a plastic block in a copying lathe to the precise contour and dimensions of a model last. To provide the illustrated last body with a hinge and thereby form a two-part slip last, a first transverse saw cut 13 is formed intermediate the ends and through the top of the last body, the cut being inclined downwardly and rearwardly in the body, and then a second transverse cut 14 is formed through the bottom of the last body in a plane offset rearwardly with respect to the first cut 13, the terminal ends 15 and 16, respectively, of the cuts 12 and 13 terminating in a proximate position which is longitudinally spaced apart in the last body, such spacing being generally in the nature of three-eighths (⅜) of an inch between the terminal ends 15 and 16 of the saw cuts. The saw cuts divide the last body into a fore-part 17 and a rear part 18, through-bores 190 and 200, respectively, being formed in each of the bodies of the fore and heel parts for receiving hinge pins (not shown) that serve to anchor the ends of a link (not shown) which hinges the parts to form a finished slip last.

Heretofore in the manufacture of slip lasts from wood, the grain of the wood ran horizontally in the last body and it was only necessary, after the two saw cuts were made to direct a lateral blow or a breaking force against, say the top of the heel part, to sever the parts evenly across the inner terminal ends 15 and 16 of the saw cuts 13 and 14, respectively. This would secure a pair of horizontal, co-operative shoulders on the mating surfaces of the last parts which would serve as accurate abutment means to position the parts in proper hinged positions in the finished slip last. I found that the foregoing procedure was impractical in the manufacture of plastic last bodies due to the fact that plastic bodies do not have a grain or planes of fracture and the following of such procedures resulted in the rejection of many plastic lasts because the co-operative shoulders formed thereby were not in horizontal planes and would therefore not accurately position the parts in the finished last after the breaking step.

My procedure, as illustrated in FIGS. 2–4 of the drawings, has as its primary objective the mechanical predisposition of that portion of the body of the last located between the inner terminal ends of the two offset saw cuts 13 and 14 so that a controlled fracture will be consistently made in the horizontal plane of the last between the terminal inner ends of the saw cuts to thereby secure a pair of co-operative and wide shoulders on the mating surfaces of the last parts when the parts are separated and provided with the usual hinge parts. To this end a tool, such as a flat bar 19 (FIGS. 2 and 3), is fixedly mounted on a workbench (not shown) and one or more cutters 20 are positioned on the bar to extend angularly from the upper edge thereof. The width of the bar corresponds to the width of the saw cuts 13 and 14 in the last body while the cutters are angularly disposed on the bar to secure the proper angle for the co-operative shoulders to be formed in the last between the inner terminal ends of the said saw cuts. As indicated in FIG. 2, the last is moved onto the cutter bar between the cutters 20—20 by entering the bar all the way into the transverse slot 14 at the bottom of the last until the cutters 20 are laterally spaced from the horizontal position of the shoulder cuts to be made in the last. As indicated by the arrows the last is then moved laterally first in the direction of one cutter and then in the direction of the other cutter, each cutter being entered into and pulled out of the last body to complete the shoulder forming operation. In the event it is found expedient to have the particular shoulder forming cuts meet internally of the last, the last will be severed into two last parts by the cutting operation. If, however, it would be found best by experiment to form non-meeting cuts in a specific plastic composition, a last breaking step would follow the cutter operation to provide acceptable co-operating shoulders on the last parts. It is also contemplated that a single cutter 20 could cut completely through the last body to form the required shoulder. The shoulder cuts so formed are indicated in FIG. 4 wherein the reference numeral 21 is a shoulder formed on the last forepart 17 and 22 is a co-operating shoulder formed in the rear part 18. It is also contemplated that the cutter bar may be provided with cutters that extend therefrom a distance somewhat less than half the longitudinal distance between the inner terminal ends of the saw cuts. In this instance the shoulder forming cuts in the last would project toward, but not meet, one another from the terminal ends of the saw cuts 13 and 14, as is depicted in FIG. 5 of the drawing, wherein numerals 23 and 24 indicate the cuts that extend from the transverse saw cuts 13 and 14, respectively. After forming the cuts illustrated in FIG. 5 the last may be broken and a clean plane of fracture will result between the inner adjacent ends of the cuts 23 and 24 to provide accurate co-operative shoulders between the mating surfaces of the last parts 17 and 18.

Now with reference to FIGS. 6–8 of the drawings, which show a modification of my process, it will be noted that a through-bore 25 is located substantially centrally between the inner terminal ends 15 and 16 of the transverse saw cuts 13 and 14, respectively. In many instances the co-operative shoulders may be formed in the last of a particular plastic construction by merely breaking apart the last parts after the formation of the bore 25 therein and a clean split or fracture will be provided between the inner terminal ends of the saw cuts to form co-operative, accurately disposed shoulders. In some instances a further predisposition to fracture must be provided in which case a rod 26 (FIG. 7) is provided for entrance into the through-bore 25 and said rod being provided with a pair of oppositely extending cutters 27—27 that extend outwardly from the bar a distance to provide a cut between the through-bore and the terminal ends of the saw cuts on each side of said bore. The bar 26 may be entered into the through-bore to cut completely through the last body in one direction and thereby provide a pair of co-operative shoulders, or, in the alternative, the cutters 27—27 can be driven partially through the last from each side thereof to either meet in the middle of the last to separate the parts or to substantially meet in the middle of the last in which latter case the last may be broken apart to provide the co-operative shoulders.

In FIG. 9 of the drawing it will be noted that a through-bore 28 may be formed in the last body and be connected to the terminal end of the transverse saw cut 13 in such a way that the through-bore actually diminishes the distance between the terminal ends of the two saw cuts thus forming a body weakened portion between the shoulders which may be split along a fracture plane that is horizontal to the last body. As illustrated in FIG. 10 in some instances two through-bores 29 and 30 may be formed in the last body at the inner ends of the saw cuts 13 and 14, respectively, thereby forming a weakened portion between the terminal ends of the saw cuts so that the body may be broken evenly to provide co-operative shoulders for the mating surfaces of the slip last.

With respect to FIG. 11 it will be noted that a cutter wire 31 is looped through the through-bores 29 and 30 of the slip last shown in FIG. 10 and the looped wire may be forcefully drawn in the direction of the arrow 32 to cut through that portion of the last body located longitudinally between the bores 29 and 30 to provide accurately formed co-operative shoulders for the mating surfaces of the slip last parts.

It will therefore be understood that I have provided a method of forming co-operative shoulders in the hinged parts of a two-part plastic slip last which consists in forming a lateral saw cut through the upper part of the last, then forming another lateral cut through the bottom part of the plastic last in a plane offset with respect to the first saw cut and then mechanically weakening the material of the body longitudinally between the inner terminal ends of the two saw cuts whereby a controlled and clean fracture or break may be made across the weakened body portions to form accurately positioned, co-operative shoulders on the mating surfaces of a hinged, two-part slip last made of non-grain materials of the plastic type.

Having thus described my invention in detail, what I claim is:

1. The process of manufacturing the shouldered, co-operative mating surfaces for a two-part last made of a non-grain material comprising partially severing a unitary last body by forming a downwardly and rearwardly extending material removing, saw cut laterally through the upper, intermediate portion of the last body, forming an upwardly and forwardly extending material removing, saw cut laterally through the lower, intermediate portion of the last body, the said saw cut being disposed in a plane offset rearwardly with respect to the first mentioned saw cut and having its inner terminal end located adjacent to the inner terminal end of the first mentioned saw cut, inserting a slicing tool into one of said saw cuts, and providing relative lateral movement between the slicing tool and the last body to cause the tool to laterally slice through the last body in a plane extending longitudinally between the inner terminal ends of the said saw cuts.

2. The process of manufacturing the shouldered, cooperative mating surfaces for a two-part last made of a non-grain material comprising partially severing a unitary last body by forming a first downwardly and rearwardly extending material removing cut laterally through the upper, intermediate portion of the last body, forming a second upwardly and forwardly extending material removing cut laterally through the lower, intermediate portion of the last body, the second material removing cut being disposed in a plane offset rearwardly with respect to the first cut and having its inner terminal end located adjacent to the inner terminal end of the first cut, inserting a slicing tool into the cuts, and providing a relative lateral movement between the slicing tool and the last body to cause the tool to laterally slice through the last body in a plane extending longitudinally between the inner terminal ends of the said material removing cuts.

3. The process of manufacturing the shouldered, cooperative mating surfaces for a two-part last made on a non-grain material comprising partially severing a unitary last body by forming a downwardly and rearwardly extending materail removing, saw cut laterally through the upper, intermediate portion of the last body, forming an upwardly and forwardly extending material removing, saw cut laterally through the lower, intermediate portion of the last body, the said saw cut being disposed in a plane offset rearwardly with respect to the first mentioned saw cut and having its inner terminal end located adjacent to the inner terminal end of the first mentioned saw cut, forming a boring cut between the terminal ends of the saw cuts, inserting a slicing tool into the bored cut, and providing relative lateral movement between the slicing tool and the last body to cause the tool to laterally slice through the last body in a plane extending longitudinally between the inner terminal ends of the said saw cuts.

References Cited in the file of this patent

UNITED STATES PATENTS

| | | |
|---|---|---|
| Re. 23,495 | McDaniel et al. | May 20, 1952 |
| 469,172 | Ottstadt et al. | Feb. 16, 1892 |
| 505,712 | Lofdahl | Sept. 26, 1893 |
| 997,059 | Harris | July 4, 1911 |
| 1,238,890 | Coleman | Sept. 4, 1917 |
| 1,240,173 | Brewer | Sept. 18, 1917 |
| 1,496,408 | Dailey | June 3, 1924 |
| 1,950,087 | Lind | May 6, 1934 |
| 2,006,417 | Topping | July 2, 1935 |
| 2,392,826 | Marcille | Jan. 15, 1946 |